US012625467B2

(12) United States Patent
Verardo et al.

(10) Patent No.: US 12,625,467 B2

(45) Date of Patent: May 12, 2026

(54) METHOD FOR MANUFACTURING A SPRUNG BALANCE OSCILLATOR FOR HIGH TORQUE VARIATION BALANCE SPRINGS

(71) Applicant: Nivarox-FAR S.A., Le Locle (CH)

(72) Inventors: Marco Verardo, Les Bois (CH); Laurent Jeanneret, Villers-le-Lac (FR)

(73) Assignee: Nivarox-FAR S.A., Le Locle (CH)

( * ) Notice: Subject to any disclaimer, the term of this patent is extended or adjusted under 35 U.S.C. 154(b) by 0 days.

(21) Appl. No.: 18/888,259

(22) Filed: Sep. 18, 2024

(65) Prior Publication Data

US 2025/0164930 A1 May 22, 2025

(30) Foreign Application Priority Data

Nov. 20, 2023 (EP) .................................... 23210963

(51) Int. Cl.

*B23P 15/00* (2006.01)

*B21C 1/02* (2006.01)

(Continued)

(52) U.S. Cl.

CPC .............. *G04B 17/066* (2013.01); *B21C 1/02* (2013.01); *G04D 7/10* (2013.01)

(58) Field of Classification Search

CPC .... G04B 17/066; G04B 17/06; G04B 17/063; B21C 1/02; G04D 7/10; G04D 7/08;

(Continued)

(56) References Cited

U.S. PATENT DOCUMENTS

2013/0308430 A1 11/2013 Verardo et al.
2017/0176941 A1 6/2017 Kohler et al.

FOREIGN PATENT DOCUMENTS

EP 2455825 A1 * 5/2012 ........... G04B 17/063
EP 2 565 727 A1 3/2013

(Continued)

OTHER PUBLICATIONS

English translation of EP-2455825-A1 (Year: 2012).*

(Continued)

*Primary Examiner* — Jun S Yoo

(74) *Attorney, Agent, or Firm* — Oblon, McClelland, Maier & Neustadt, L.L.P.

(57) ABSTRACT

A method for manufacturing an oscillator for a timepiece made from a balance and a balance spring, the method including measuring the average moment of inertia of a batch of balances; providing pinned up balance springs, the balance springs having an excess number of coils forming up to three more turns than the final number of coils; making a first predetermined external cut of the balance springs over a length of one to two coils, then measuring the torque of the balance springs and sorting them according to the value of the measured torque; assembling the balance springs, whose measured torque corresponds to the balances, are assembled to form an oscillator with an intermediate frequency and to determine the length to be cut to achieve the desired oscillation frequency; making a second external cut of the balance springs selected to achieve both the desired oscillation frequency and a target value.

6 Claims, 2 Drawing Sheets

(51) Int. Cl.
*G04B 17/06* (2006.01)
*G04D 7/10* (2006.01)

(58) Field of Classification Search
CPC ...... G04D 7/12; G04D 7/1264; G04D 7/1292; G06F 18/241
See application file for complete search history.

(56) References Cited

FOREIGN PATENT DOCUMENTS

| | | | | |
|---|---|---|---|---|
| EP | 3 181 938 | B1 | 2/2019 | |
| EP | 2 864 844 | B1 | 9/2020 | |
| RU | 2 557 351 | C1 | 7/2015 | |
| RU | 2 618 739 | C2 | 5/2017 | |
| RU | 2675181 | C2 * | 12/2018 | ........... G04B 17/066 |
| WO | WO 2021/053501 | A1 | 3/2021 | |

OTHER PUBLICATIONS

English translation of RU-2675181-C2 (Year: 2018).*

Combined Russian Office Action and Search Report issued on Apr. 18, 2025 in Russian Patent Application No. 2024129956/28 (with English translation of office action), 17 pages.

European Search Report issued Apr. 18, 2024 in EP 23210963.7 filed on Nov. 20, 2023, 3 pages (with English Translation of Categories of Cited Documents).

Groupe des Fabricants suisses de spiraux "Le Spiral, Ses proprietes ses qualites sa manipulation", Classeur technique a l'usage du praticien, 1969, XP055654217, 71 pages.

* cited by examiner

METHOD FOR MANUFACTURING A SPRUNG BALANCE OSCILLATOR FOR HIGH TORQUE VARIATION BALANCE SPRINGS

CROSS-REFERENCE TO RELATED APPLICATION

This application claims priority to European Patent Application No. 23210963.7 filed on Nov. 20, 2023, the entire disclosure of which is hereby incorporated herein by reference.

TECHNICAL FIELD OF THE INVENTION

The invention relates to the general technical field of mechanical oscillators used in particular in the watchmaking industry. More particularly, the invention relates to a method for manufacturing oscillators including a balance spring and a balance.

TECHNOLOGICAL BACKGROUND

Despite the extreme precision and reproducibility of machining operations, adjustments almost always have to be made, either during an assembly operation or, more frequently, during an adjustment or fine-tuning operation, in particular for an unbalance adjustment and inertia adjustment in the case of moving parts, and for a frequency adjustment in the case of an oscillator.

The pairing of certain components must be perfected in particular at the assembled stage which components, when taken independently, are within the machining or production tolerances, but which cannot be assembled purely and simply because of the operating restrictions specific to the sub-assembly or to the assembly once installed.

This is particularly true of the regulating members of timepieces, and especially of sprung balance assemblies. It would appear that unbalance and inertia adjustments, both static and dynamic, are already very delicate at the stage of individual components, and that these adjustment operations become extremely complex when the components are assembled. Dynamic adjustments in particular are tricky to implement. Various techniques are known for adjusting a sprung balance sub-assembly, two of which are most commonly used.

The "Omegametric" system consists of:

- classifying the balance springs already cut at the right point of attachment according to their torque;
- classifying balances according to their inertia;
- pairing a balance chosen from a particular class, with a balance spring also chosen from a particular class, these classes being compatible with each other to achieve the chosen precision of frequency.

This method requires large stocks of components and imposes numerous logistical constraints.

An alternative is the "Spiromatic" system:

- a pinned balance spring on a balance;
- this balance spring is cut to the length that gives a torque adapted to the inertia of the balance. With good control of balance inertia and balance spring torque dispersions, this cutting point lies within a maximum tolerance of +/−50° of the theoretical target value.

This method does not guarantee a high degree of precision of the point of attachment of the balance spring in relation to the outlet of the collet, which can result in a loss of chronometric performance. This is particularly true when the balance springs have a wide nominal torque distribution.

The first technique is very expensive, and the second is mediocre in terms of chronometric performance. Moreover, they are unsuitable, or poorly suited, when there is a very large variation in the torque of the balance springs at the end of the manufacturing process. This makes the combination with a balance and the adjustments difficult, and has an impact on the chronometric performance of the oscillator, which is typically mediocre.

SUMMARY OF THE INVENTION

One of the aims of the invention is to provide a cost-effective method for assembling an oscillator.

More specifically, one of the aims of the invention is to propose a method for manufacturing an oscillator including a balance spring and a balance, which method is cost-effective despite the large torque dispersion of the balance springs.

To this end, the invention relates to a method for manufacturing an oscillator for a timepiece made from a balance and a balance spring, the method comprising the following steps of:

- measuring the average moment of inertia of a batch of balances;
- providing pinned up balance springs, the balance springs having an excess number of coils forming up to three more turns than the final number of coils;
- making a first predetermined external cut of the balance springs with a defined excess of a length of one to two coils, then measuring the torque of the balance springs and sorting them according to the value of the measured torque;
- assembling the balance springs whose measured torque corresponds to the balances to form an oscillator with an intermediate frequency;
- making a second external cut of the balance springs selected to achieve both the desired oscillation frequency and a target value to obtain an attachment point angle within +/−50° of the theoretical value.

According to other advantageous alternative embodiments of the invention:

- the balance springs are made from a blank made of a metal or metal alloy;
- the blank is covered with a surface layer of a ductile material;
- the metal or metal alloy is selected from titanium, niobium, zirconium or a combination of these metals;
- the balance springs are shaped by a step of wire drawing and/or rolling the blank, alternating with at least one heat treatment step, with a step of winding in form the balance spring being carried out before the final heat treatment step;
- the ductile surface layer is removed after rolling, and before winding in.

BRIEF DESCRIPTION OF THE FIGURES

Other features and advantages of the invention will become apparent from the following detailed description, which is given by way of example and is by no means limiting, with reference to the accompanying drawings in which.

DETAILED DESCRIPTION OF THE INVENTION

The invention relates to a method for manufacturing an oscillator 1 intended to equip a horological movement.

'Manufacturing' is understood in the broadest sense to mean the steps involved in manufacturing parts of the oscillator 1 and the steps involved in assembling parts of the oscillator 1.

During the first step, a batch of balances 2 is taken from a production run, the batch of balances 2 being obtained using a process that makes it possible to obtain a given inertia for the balances. The average inertia of the batch of balances 2 is measured to ensure that there is not too great a dispersion within the batch, and any balances with an inertia that is too far from this average are removed from the batch.

Figure 1:
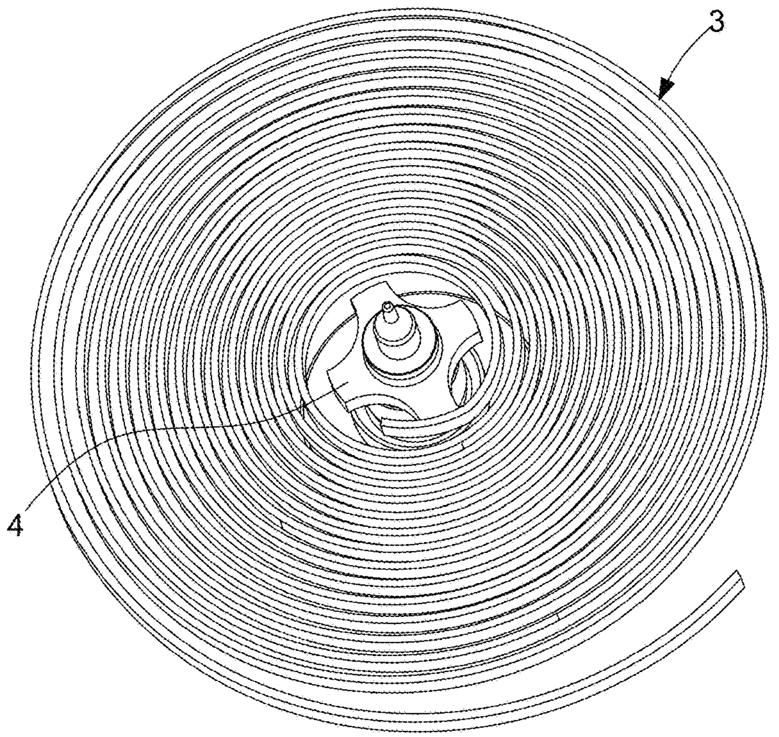
FIG. 1 shows a pinned up balance spring with an excess number of coils.

In the second step, pinned up balance springs 3 are supplied, which balance springs have an excess number of coils forming up to three additional coils, as shown in FIG. 1. Such an excess number of coils allows the balance springs to be shortened later as part of an adjustment operation.

These balance springs are made from a blank made of a metal or metal alloy.

A surface layer of a ductile material is then deposited on the alloy blank to facilitate shaping into wire form. This thickness of ductile material means that the blank can be easily stretched, drawn and rolled.

Finally, in order to shape the balance springs 3, the blank covered with the ductile surface layer is deformed by wire drawing and then rolling, then undergoes at least one heat treatment step, and finally a winding in step is carried out to form the balance springs 3.

A deformation step as a whole denotes one or more deformation treatments, which can comprise wire drawing and/or rolling. Wire drawing can require the use of one or more drawplates in the same deformation step or in different deformation steps if necessary. Wire drawing is carried out until a wire having a round cross-section is obtained. Rolling can be carried out during the same deformation step as wire drawing, or in another subsequent deformation step. Advantageously, the last deformation treatment applied to the alloy is a rolling operation, preferably having a rectangular profile that is compatible with the inlet cross-section for a winder spindle.

The addition of ductile material can be galvanic, by PVD or CVD, or mechanical; in this case, a sleeve or a tube of ductile material is obtained, which is adjusted on an alloy blank, which is then thinned out during the one or more steps of deforming the blank.

The ductile material is eliminated once all deformation treatment operations have been carried out, i.e. after the final rolling operation, and before the winding operation. The wire is, for example, stripped of its layer of ductile material by chemical etching, using an acid-based solution for example.

At the end of these steps, balance springs 3 with an excess external length of at least three coils, with an alloy core and a ductile shell are obtained.

The balance springs 3 obtained thus have a variable cross-section. This is because the wire forming the balance spring is not uniformly regular because the alloy is not as easily deformed as copper and as a result, the cross-section of the wire varies after the various deformation steps. There is thus a high degree of torque variability among the balance springs 3 produced and the "Spiromatic" system cannot be envisaged or used in such a case.

Figure 2:
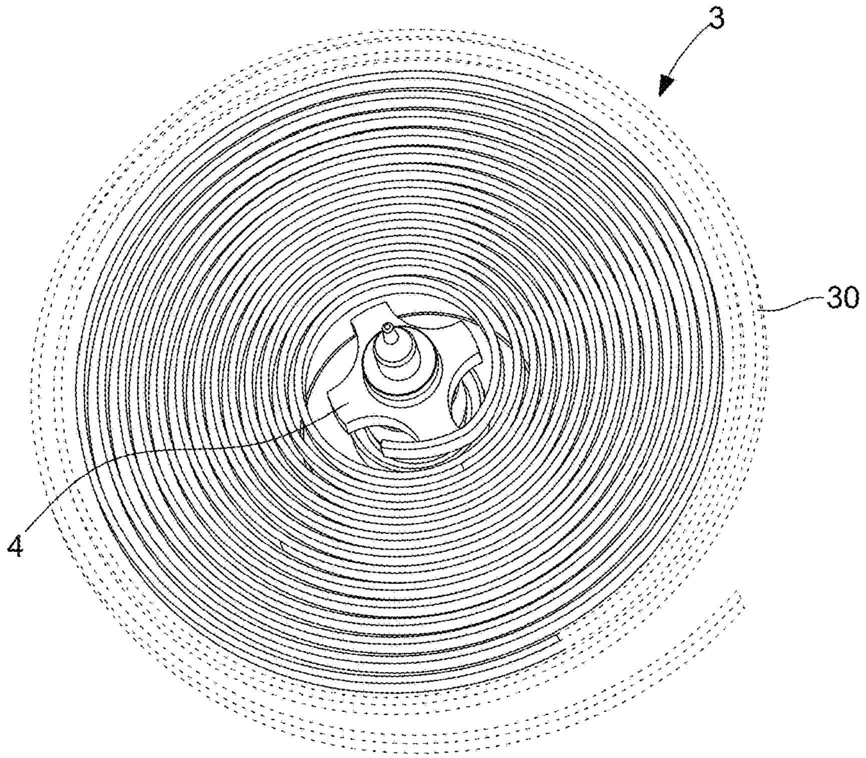
FIG. 2 shows a pinned up balance spring which has undergone a first external cut of one to two coils.
Figure 3:
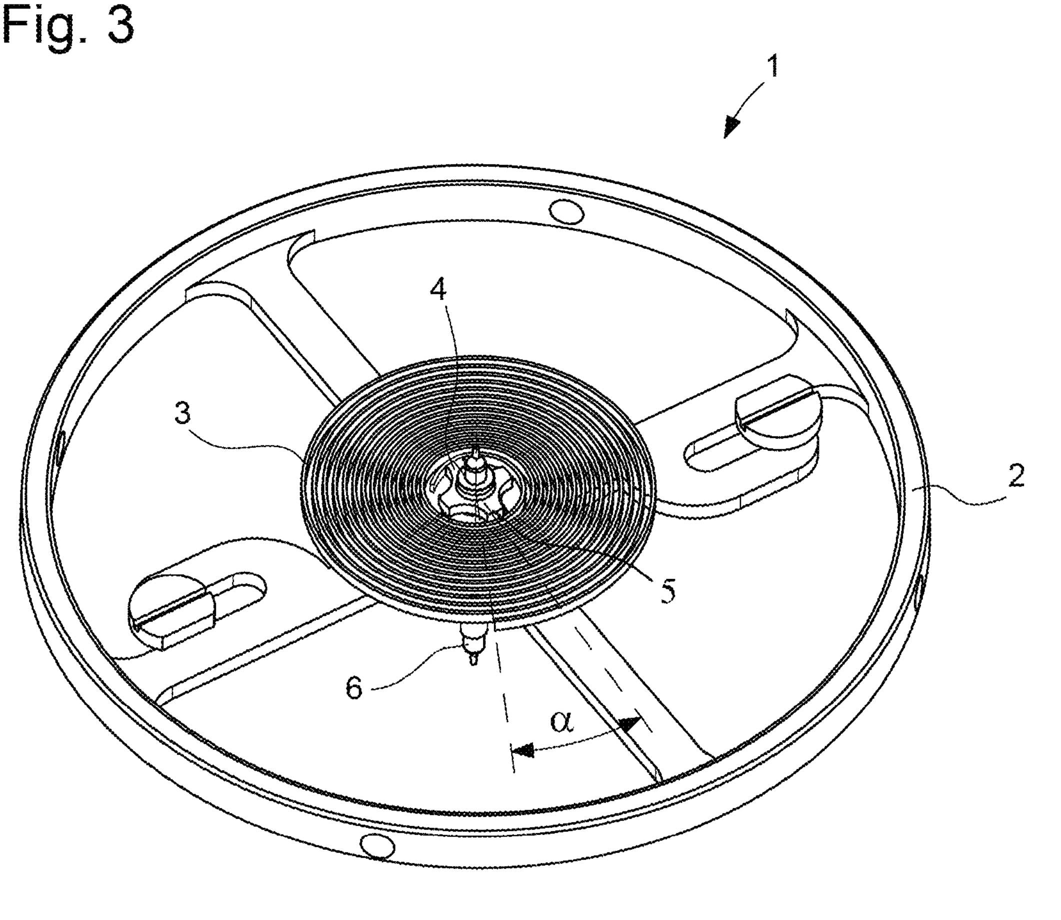
FIG. 3 diagrammatically shows an oscillator obtained using the manufacturing method according to the invention.

The method according to the invention comprises a third step in which a first external cut 30 is made to obtain a pre-cut balance spring 3, as shown in FIG. 2. The length of the outer cut 30 is made over one or two coils so that an excess length remains on the balance spring 3 to make a second subsequent cut when adjusting the balance spring 3 on the balance 2.

Then, in the fourth step, the torque of the balance springs 3 is measured, and the balance springs 3 are sorted according to the measured torque value to form batches of balance springs with a similar measured torque.

In the fifth step, the balance springs 3, whose measured torque corresponds to the inertia of the balances 2, are assembled to form an oscillator with an intermediate frequency and to determine the length to be cut to achieve the desired oscillation frequency.

Then, in the sixth step, a second external cut is made to the selected balance spring 3 to achieve both the desired oscillation frequency, and to achieve a target value for the angle $\alpha$ formed by the point of attachment 6 of the balance spring 3 to a stud and the outlet 5 of the collet 4 after the second external cut, with a tolerance of plus or minus 50° of the theoretical value. The theoretical value is defined in such a way that the product requirements can be met once the curve has been formed.

Thus, such a method allows a batch of balance springs to be paired in such a way that all of the balance springs in the batch can be paired with the batch of balances within a tolerance of +/−50°.

The method of the invention thus provides a sprung balance assembly tuned to a particular frequency, with good reliability and accuracy.

The invention claimed is:

1. A method for manufacturing an oscillator for a timepiece made from a balance and a balance spring, wherein the method comprises the following steps of:

measuring an average moment of inertia of a batch of balances;

providing pinned up balance springs, the balance springs having an excess number of coils forming up to three more turns than a final number of coils;

making a first predetermined external cut of the balance springs with a defined excess of a length of one to two coils, then measuring a torque of the balance springs and sorting them according to a value of the measured torque;

assembling the balance springs whose measured torque corresponds to the balances to form an oscillator with an intermediate frequency;

making a second external cut of the balance springs selected to achieve both a desired oscillation frequency and a target value to obtain an attachment point angle ($\alpha$) within +/−50° of a theoretical value.

2. The manufacturing method according to claim 1, wherein the balance springs are made from a blank made of a metal or metal alloy.

3. The manufacturing method according to claim 2, wherein the blank is covered with a surface layer of a ductile material.

4. The manufacturing method according to claim 2, wherein the metal or metal alloy is selected from titanium, niobium, zirconium or a combination of these metals.

5. The manufacturing method according to claim 2, wherein the balance springs are shaped by a step of wire drawing and/or rolling the blank, alternating with at least one heat treatment step, with a step of winding in form the balance spring being carried out before the final heat treatment step.

6. The manufacturing method according to claim 3, wherein the ductile surface layer is removed after rolling, and before winding in.

* * * * *